March 21, 1939.　　　T. A. HUTSELL　　　2,151,110
BEER DISPENSING DEVICE
Filed May 5, 1938　　　5 Sheets-Sheet 1

INVENTOR.
Thomas A. Hutsell
BY
Smith & Tuck
ATTORNEYS

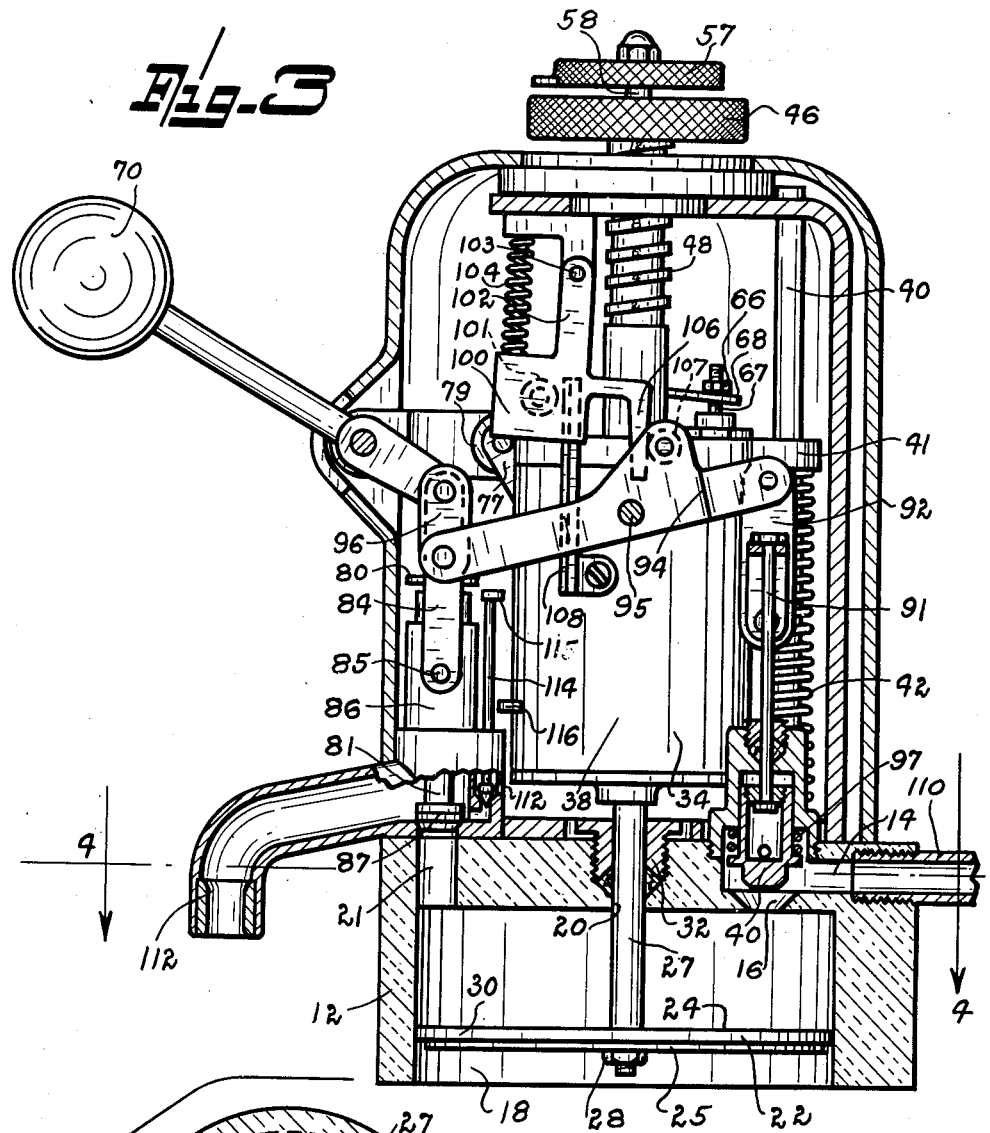
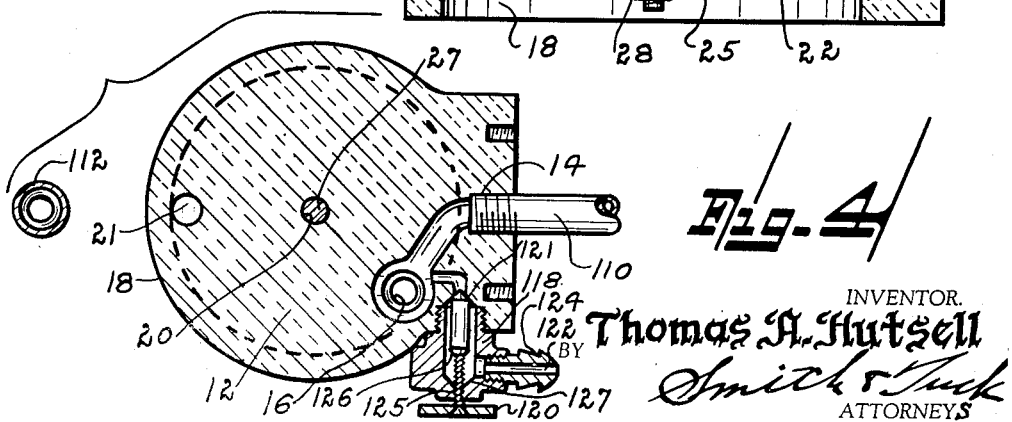

March 21, 1939. T. A. HUTSELL 2,151,110
BEER DISPENSING DEVICE
Filed May 5, 1938 5 Sheets-Sheet 3

INVENTOR.
Thomas A. Hutsell
BY Smith & Tuck
ATTORNEYS

March 21, 1939.         T. A. HUTSELL         2,151,110
BEER DISPENSING DEVICE
Filed May 5, 1938         5 Sheets-Sheet 4

INVENTOR.
Thomas A. Hutsell
BY Smith & Tuck
ATTORNEYS

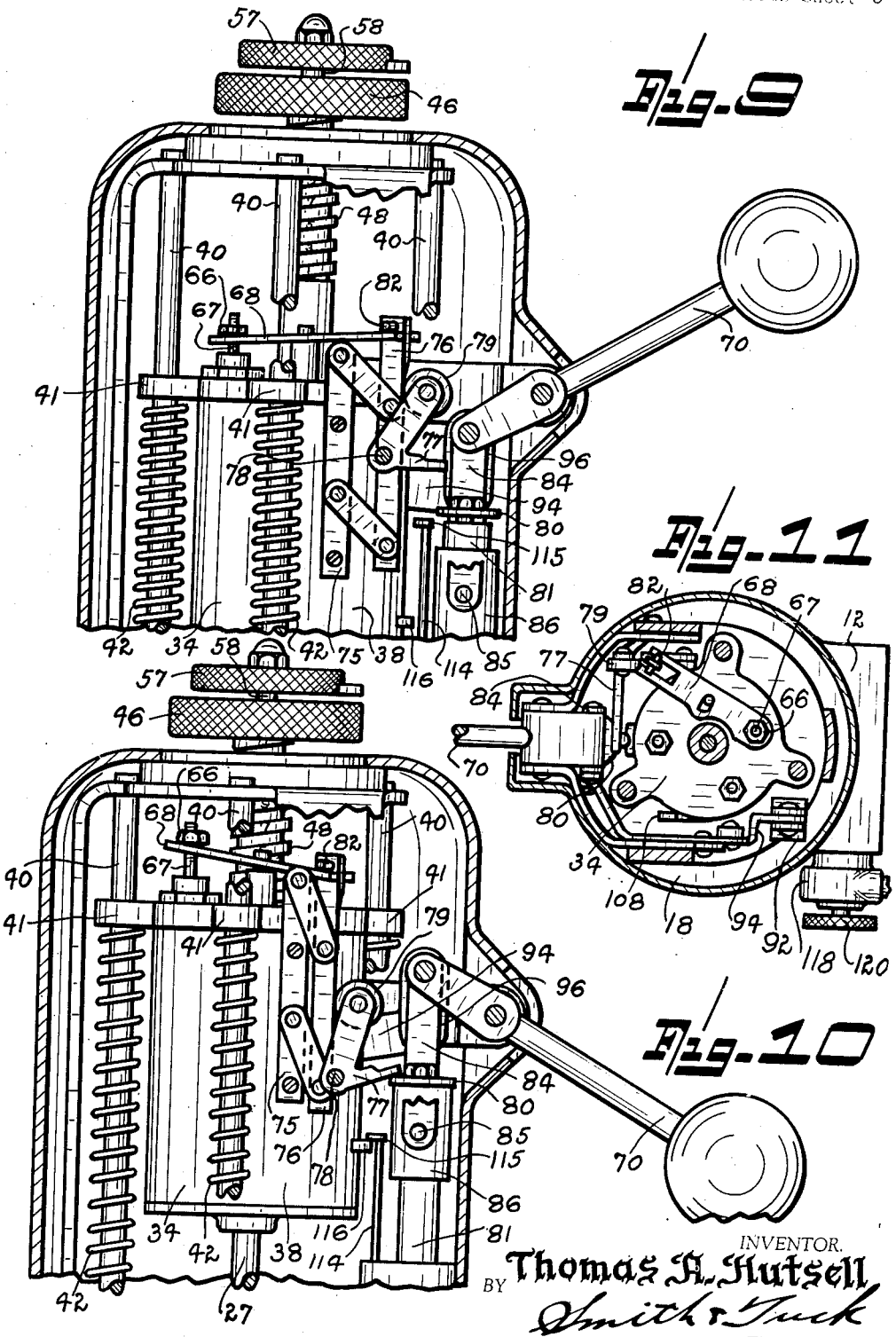

Patented Mar. 21, 1939

2,151,110

UNITED STATES PATENT OFFICE 2,151,110

BEER DISPENSING DEVICE

Thomas A. Hutsell, Seattle, Wash.

Application May 5, 1938, Serial No. 206,245

12 Claims. (Cl. 225—7)

My present invention relates to equipment for handling, metering and dispensing of effervescent, or gas-charging liquids, and more particularly to a beer dispensing device.

This present invention is similar in many respects to my co-pending application Serial Number 180,430. In my present equipment, however, I have simplified my former construction and have modified certain parts thereof so that certain advantages and improvements are obtained in the new structure.

My present dispenser has for its primary object the drawing, measuring and uniform dispensing of effervescent or gas-charged beverages such as, for instance, beer.

A further object of my present invention is to provide means, of a simplified construction, for the handling of beer and similar liquids where the conditions under which dispensing takes place will vary from time to time particularly as to temperature and pressure on the liquids to be dispensed.

A further object of my present invention is to provide means whereby beer and similar liquids can be dispensed by inexperienced help, in such a manner that uniform results are obtained even though conditions change slightly between successive drafts.

Another important object of my present invention is to provide means whereby the mechanism may be quickly and easily set for drawing varying amounts of liquid and further to be capable of quick setting to change the rate of discharge of the liquid measured.

Other and more specific objects will be apparent from the following description taken in connection with the accompanying drawings, wherein—

Figure 3 is a view similar to Figure 2 but with certain additional parts broken away so that other portions of the mechanism will be brought into view in a manner to more clearly present their construction.

Figure 4 is a bracketed, cross-sectional view, in plan, taken along the line 4—4 of Figure 3.

Figure 9 is a fragmentary, vertical, sectional view taken substantially in the same sense as Figure 3 but showing the opposite side of my dispenser.

Figure 10 is similar to Figure 9 but shows the operating handle and the parts controlled thereby in the position assumed when the handle is depressed.

Figure 11 is a cross-sectional view, in plan, taken along the line 11—11 of Figure 5.

Figure 1:
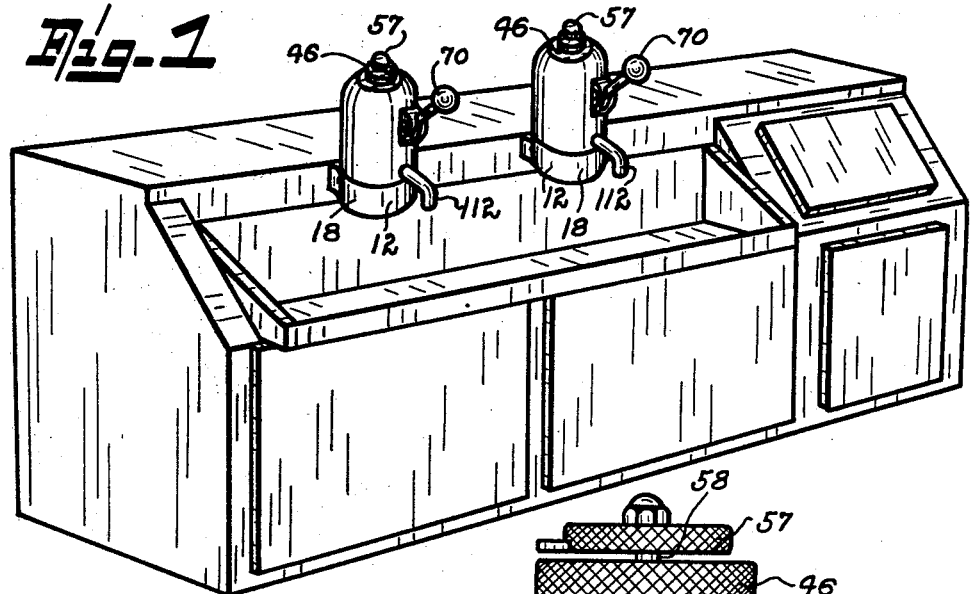
Figure 1 is a perspective view showing the outside appearance of my dispensers and how they appear installed on a typical bar.
Figure 2:
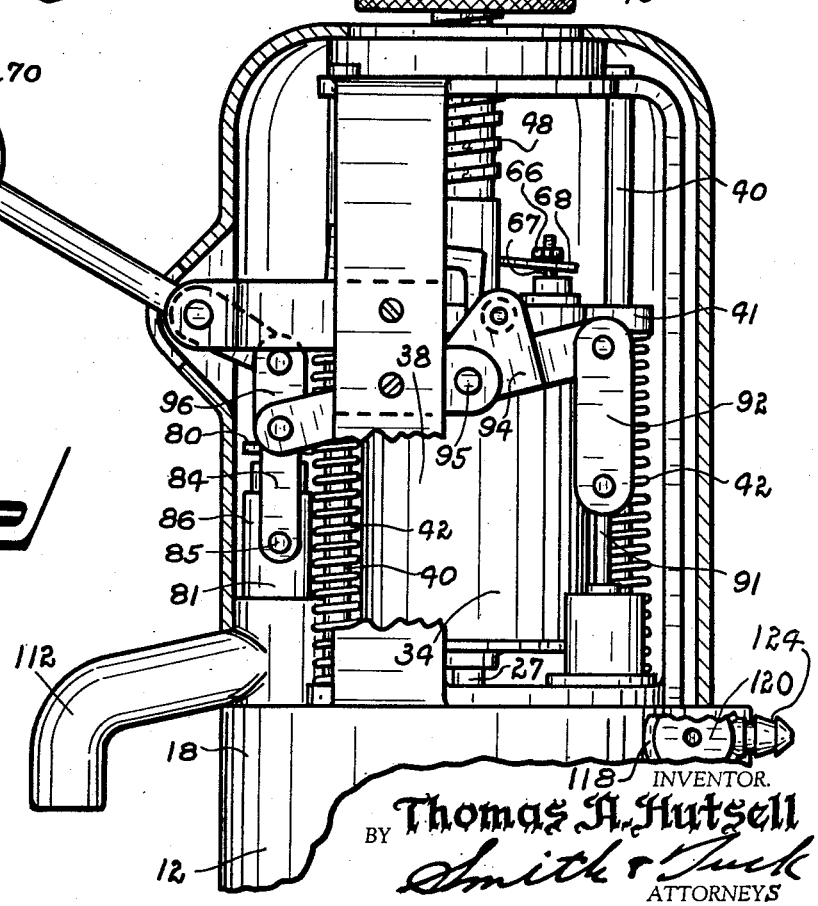
Figure 2 is an elevation partly in section illustrating my dispensing device.

Referring to the drawings, throughout which like reference characters indicate like parts, 12 designates the measuring cylinder molding of my device. This member I prefer to form of molded plastic material of the resin base type, preferably, to the end that it will have maximum resistance to heat transmission and further will be clean and can be molded with the various openings required such as the intake pipe opening 14, the intake valve seat 16, the cylinder proper 18, the piston rod opening 20, and the discharge valve opening 21. Disposed for reciprocation within cylinder 18 is the metering piston 22. This is preferably formed of two plates as 24 and 25 secured to piston rod 27 as by the reduced portion and nut shown at 28. Included between the two plates 24 and 25 is the operating piston washer 30. To prevent leakage along piston rod 27 I provide a packing gland at 32 which may be adjustably seated so as to provide secure engagement between the packing and rod 27.

Secured to the upper end of piston rod 27 is the metering piston control assembly 34. This consists essentially of an inner cylinder 36 and an annularly disposed oil receiving cylinder 38. Piston 34 is guided by a plurality of rods 40 which are adapted to engage, one each, outstanding lugs 41 formed as part of the pitson assembly 34. These lugs in turn form an abutment for the compression springs 42 which serve as the operating means which force assembly 34 with its connected piston 22 upwardly during the expulsion stroke of the piston.

Coaxially disposed with cylinder 18 is piston 44 which is so supported that cylinder 36 reciprocates on it. The positioning of piston 44 is controlled by hand-wheel 46 which in turn adjusts the position of piston 44 by means of the large thread 48 cut in the stem of piston 44. Piston 44 controls the extent of the downward motion of the assembly 34, piston rod 27, and piston 22, by forming a stop at 50 where it engages an upper member 52 of piston assembly 34. It would naturally follow that as the position of piston 44 is changed by adjustment of screws 46 the lower most movement of the piston will be limited and in this way accurate measurement of the volume of liquid that can be admitted above piston 22 will be accurately and positively determined. The upper movement of piston 22 is limited by the surface 53 of cylinder 18.

Cylinder 36 is vented at its top and bottom, at its top by a passageway 55 which is controlled by a check valve 56. This check valve is in turn controlled by hand wheel 57 which serves to adjust the lowermost part of stem 58 so as to limit the rise of valve 56 from its seat. In this way a control of the outflow of oil from cylinder 36 is provided. The oil passing through opening 55 then passes out through a vent 59 into an annular channel 62 which communicates with passageway 64. This passageway is in turn controlled by a locking and pressure control valve 65. The oil pressure in chamber 62 is controlled by adjustment of nut 66 on the stem of plunger 67 which places the desired tension on the spring 67a which urges plunger 67 downwardly. Valve 65 can open normally only when the spring urged plunger 67 is raised through means of the balanced lever 68 and associated mechanism when the operating handle 70 is depressed. The oil which has been forced out of cylinder 36 through the passageways indicated then flows down through opening 71 into the annular chamber 38 where, when the proper phase of the cycle occurs, it then is drawn through the opening in the bottom of chamber 38 up past check valve 73 until it is again confined within cylinder 36.

Plunger 67 is operated by the mechanism probably best shown in Figures 9, 10, and 11. This is accomplished by a parallelogram arrangement consisting of a member 75 which is fixedly secured to cylinder assembly 34. A second parallel member 76 is operatively joined to member 75 by two connecting links, of equal length, disposed in parallel relationship after the showing of Figs. 9 and 10. A connecting bell crank 77 which is disposed for partial revolution about the fixed pivot 78 has a roller 79 which is adapted to engage member 76 and has the other leg of the bell crank disposed within the path of washer 80 which moves with the outlet valve assembly 81 and which is thus operated by handle 70. Member 76 is provided at its upper end with a through pin 82 which has a bearing on the upper surface of the bifurcated end of lever 68 after the showing, particularly, of Figure 11. When so arranged any pressure to the left as viewed in Figures 9 and 10 applied to member 76 lowers it and thus depresses that end of lever 68 and raises the other end thus raising plunger 67.

Figure 5:
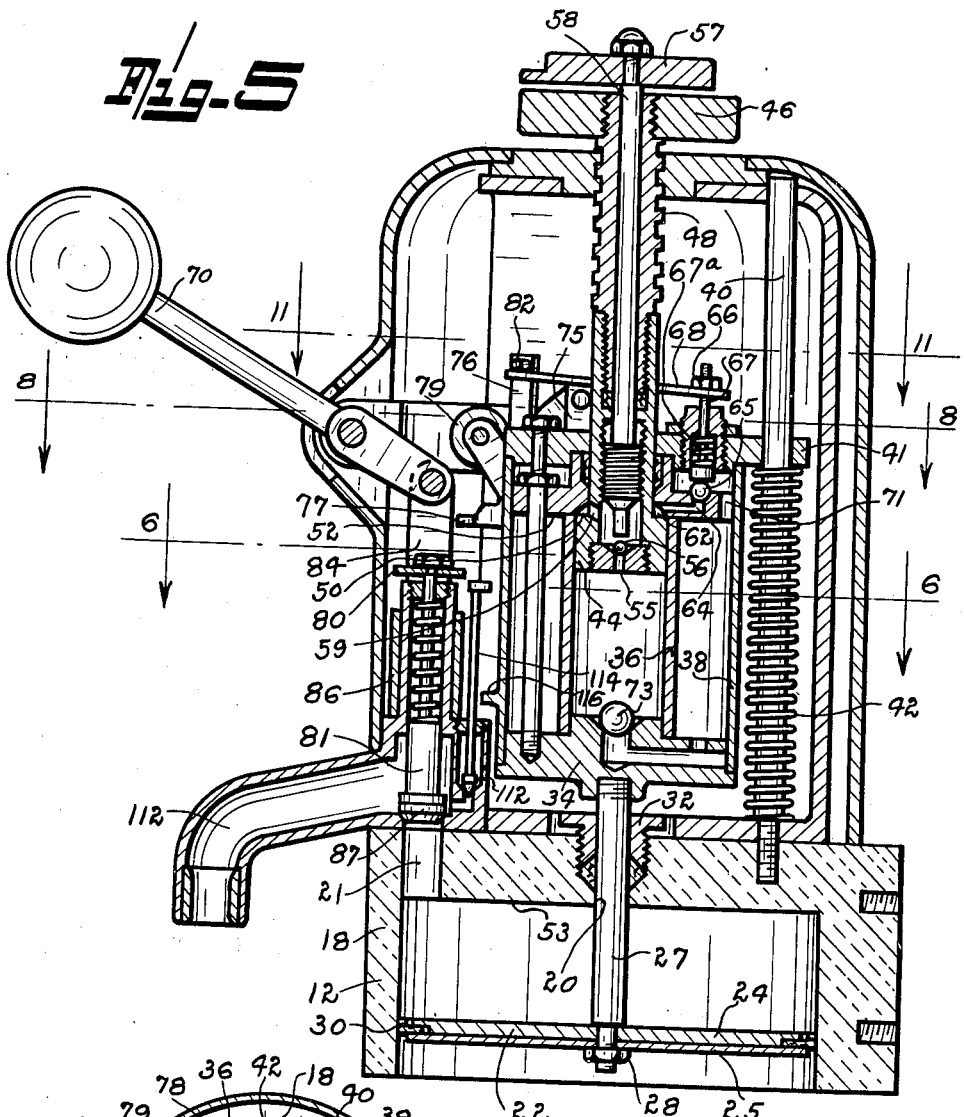
Figure 5 is a sectional view in elevation similar to Figures 2 and 3 but showing in cross-section the inner parts of my device, the section line being taken substantially along two radii as indicated on Figure 6.
Figure 6:
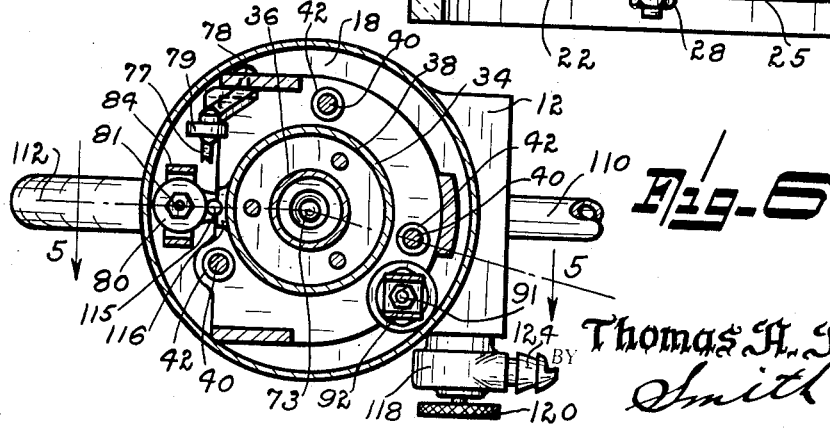
Figure 6 is a cross-sectional view in plan taken along the line 6—6 of Figure 5.
Figure 7:
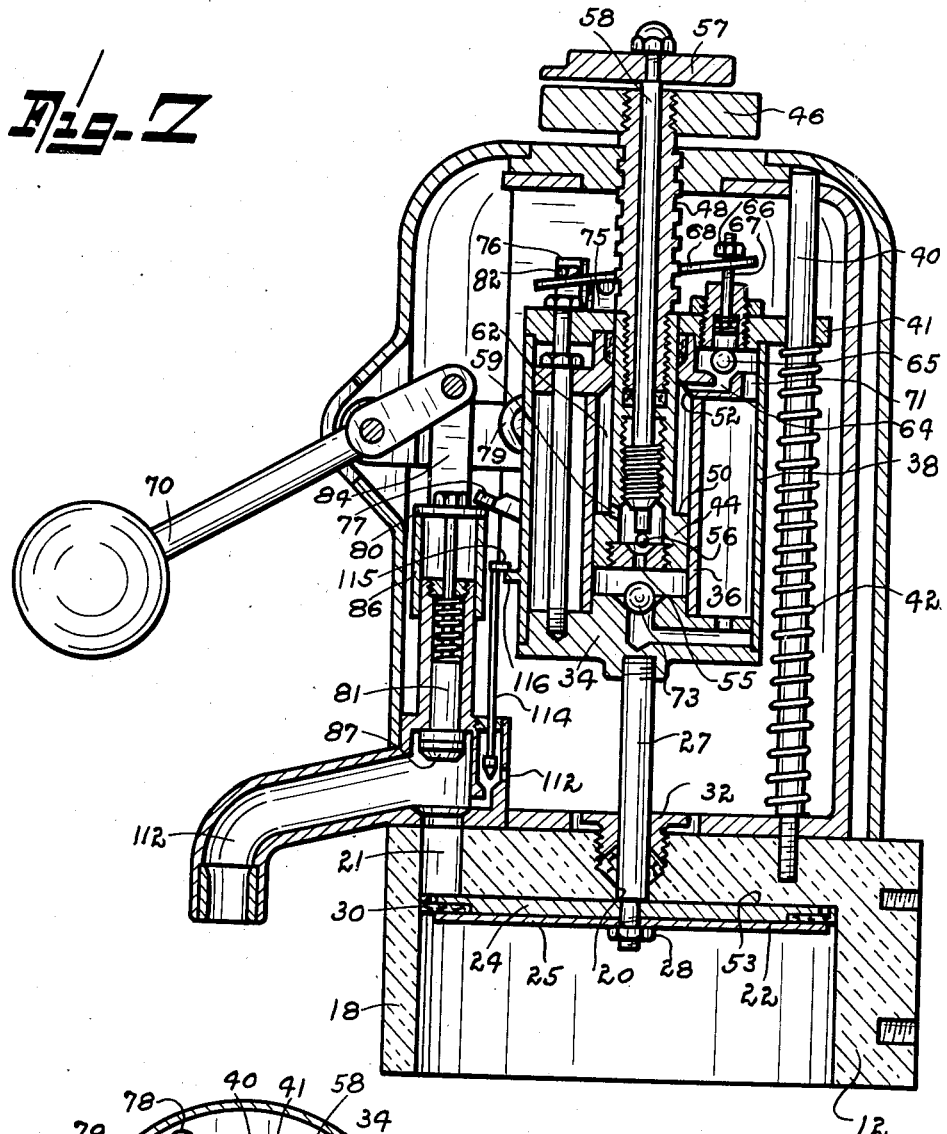
Figure 7 is a view taken along the same cutting planes as Figure 5 and in the same sense, but showing the dispensing, controlling handle in its depressed position and with the parts controlled by it, in the position they would assume with this change in the position of the operating handle.
Figure 8:
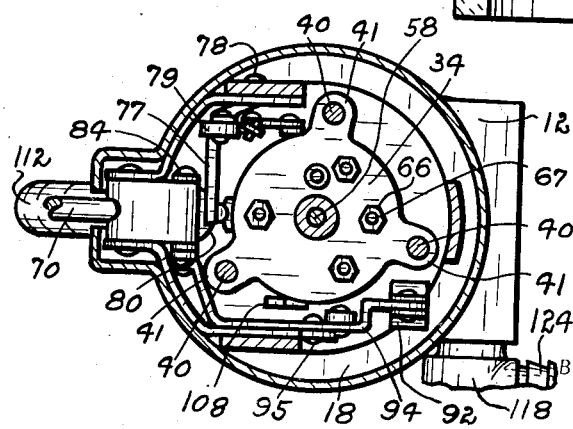
Figure 8 is a cross-sectional view, in plan, taken along the line 8—8 of Figure 5.

It is believed that a study of Figures 3, 5, and 7 will show the method employed to operate the outlet valve 81. This consists of yoke 84 which is pivotally secured as at 85 to a sleeve 86 which encircles the valve assembly 81 and is adapted at certain phases of the operating cycle to engage washer 80 and thus raise the entire assembly including valve 87.

The operation of the intake valve 90 is accomplished by a piston rod 91 and link 92 which is pivotally connected to lever 94. This lever is pivoted on a fixed pivot at 95 and at its opposite end is pivotally connected to lever 70 by means of link 96. In this manner when the operating handle 70 is in its upper position the piston rod 91 through the linkage described is raised, lifting valve 90 up off its seat 16 against compression spring 97.

In order to provide an accurate accounting of the liquid dispensed I provide a conventional tally or counting mechanism at 100 which mechanism is provided with a friction drive wheel 101 and is secured to a pivoted frame 102. This frame is pivoted at 103 and is normally urged to the right as viewed in Figure 3 by a compression spring 104. During the downward travel of piston 22 a portion of member 102 shown at 106 engages a roller 107 which is revolvably mounted on lever 94. When the piston is traveling upwardly as in the dispensing stage of the cycle wherein the operating handle 70 is in its lower position, wheel 107 is withdrawn to the right as viewed in Figure 3 and, under urgence of spring 104, friction wheel 101 is then able to engage its friction surface 108 and thus during the dispensing cycle, it will accurately measure the volume dispensed and when the piston is on its filling cycle the counting mechanism is lifted from surface 108 and no registry is made that might interfere with accurate final results.

*Method of operation*

In starting the operation of my device it may be assumed that the piston 22 is in its uppermost position as is illustrated in Figure 7 and it is normally held in this position by the plurality of compression springs 42. As soon as it is desirable to use the device the operating handle 70 is raised to its uppermost position thereby opening valve 90 as in Figure 3. This permits the beer or other liquid under pressure to enter cylinder 18 through the supply pipe 110. The pressure of this liquid must be sufficient to force piston 22 downwardly to its fullest extent, against springs 42, until the piston assembly 34 comes to rest on piston 44 which has been set to a predetermined adjusted position.

To assure full control of the beer it is necessary to, at all times, keep sufficient pressure on the same to prevent the formation of gas bubbles, even tiny ones, in the beer being measured otherwise excessive foaming may result. For the majority of beers a minimum pressure of fifteen to twenty pounds a square inch is required in cylinder 18. This pressure is provided for by the proper choice of strength for spring 67a and by so adjusting nut 66, disposed on plunger 67, that the oil in chamber 62 cannot lift valve 65 from its seat until its pressure is built up sufficiently to maintain the desired pressure in cylinder 18.

During this charging of cylinder 18 the oil which was formerly in chamber 38 has passed up past the ball check valve 73 and has come to rest in cylinder 36.

When dispensing is desired handle 70 is moved to its lowermost position as indicated in Figures 7 and 10. When this occurs valve 90 is closed and as soon as the slack has been taken up by sleeves 86 valve 87 is opened venting the measured charge of beer to atmosphere. The next sequence in the operation is the raising of plunger 67 by means of the mechanism connected to handle 70 and under urgence of springs 42 assembly 34 carrying with it piston 22, is moved upwardly forcing the beer in the cylinder out through the discharge spout 112. The speed of this discharge is controlled by the clearance permitted check valve 56 by stem 58 inasmuch as cylinder 36 and piston 44 act as a dash-pot and control the speed of delivery.

To provide against liquid becoming air-bound in spout 110, I provide a vent at 112. This vent is normally closed by valve 114 and is opened by arranging a lip on the stem of valve 114 as 115 to be lifted by a lug 116 on assembly 34 near the upward limit of its movement as is indicated in Figure 7.

When handle 70 is in a horizontal position the dispenser is in its inoperative condition with the dispensing valve 87 and the intake valve 40 closed.

An air bleeding and blow out valve is provided at 118. If any air is trapped in the intake portion of the mechanism, it may be discharged by the keg pressure on the beer supply line by unscrewing valve stem 120 so as to lift the pointed end of the same from seat 121. The air will be forced out along stem 120 and finally through passageway 122; the operation should be continued until beer appears.

If it is desired to blow the beer out of the cooling coils and associated tubing back into the beer keg, an air hose may be connected to the grooved tip 124 and by applying an air pressure greater than the keg pressure the lines can be blown clear. To avoid loss of air pressure at threads 125, stem 120 should be unscrewed until valve portion 126 of stem 120 comes to rest on seat 127.

The foregoing description and the accompanying drawings are believed to clearly disclose a preferred embodiment of my invention but it will be understood that this disclosure is merely illustrative and that such changes in the invention may be made as are fairly within the scope and spirit of the following claims.

I claim:

1. In a beer dispensing device the combination of, a metering chamber adapted to be formed of a molded plastic; a reciprocable piston disposed within said chamber, said piston adapted to be depressed by controlled fluid pressure; compression springs disposed to resist said fluid pressure and to raise said piston when said fluid pressure ceases to act upon said piston; a spring-closed intake valve for said metering chamber; a spring-closed dispensing valve for said metering chamber; operating means for opening said dispensing valve; means for holding said intake valve open and means controlled by the operating means for releasing the holding means whereby the intake valve is closed before the dispensing valve is opened.

2. In a beer dispensing device the combination of, a metering chamber adapted to be adjustably varied in volume; a reciprocable piston disposed within said chamber, said piston adapted to be depressed by fluid pressure; compression springs disposed to resist the movement of said piston by said fluid pressure and to raise said piston when said fluid pressure ceases to act upon said piston; a spring-closed intake valve for said metering chamber; a spring-closed dispensing valve for said metering chamber; operating means for opening said dispensing valve; means for holding said intake valve, means for holding said intake valve open and means controlled by the operating means for releasing the holding means whereby the intake valve is closed before the dispensing valve is opened.

3. In a beer dispensing device the combination of, a measuring cylinder; a reciprocable piston disposed within said cylinder, said piston adapted to be depressed by fluid pressure; means for holding said piston in a depressed position; springs disposed to resist said fluid pressure and to raise said piston when said fluid pressure ceases to act upon said piston and said holding means is released; a spring-closed intake valve for said measuring chamber; a spring-closed dispensing valve for said measuring chamber; operating means for opening said dispensing valve; means for holding said intake valve open and means controlled by the operating means for releasing the holding means whereby the intake valve is closed before the dispensing valve is opened.

4. In a beer dispensing device the combination of a measuring and dispensing chamber; a reciprocable piston disposed for vertical movement within said metering chamber; spring means disposed to raise said dispensing piston; means for introducing fluid pressure to depress said piston; means for adjusting the travel of said piston to vary the capacity of the dispensing chamber; fluid control means adapted to control the dispensing speed of said piston; said dispensing chamber having an inlet valve and a dispensing valve; operating means for opening a dispensing valve and means actuated by the operating means for closing the intake valve before the dispensing valve is opened.

5. In a beer dispensing device the combination of a measuring and dispensing cylinder, a reciprocable piston disposed within said cylinder adapted to be depressed by fluid pressure; spring-urged means disposed to raise said dispensing piston; means for adjusting the travel of said piston to vary the capacity of the dispensing cylinder; fluid control means adapted to control the upward speed of said piston; means for adjusting said fluid control means to provide varying speed of travel for said piston, said dispensing cylinder having a spring closed inlet valve seated in its upper surface; a spring-closed dispensing valve for said cylinder disposed substantially above the top of said cylinder; operating means for opening the dispensing valve and means actuated by the operating means for releasing the open intake valve so it may close before the dispensing valve is opened.

6. In a beer dispensing device the combination of, a measuring and dispensing chamber; a spring lifted piston, disposed within said dispensing chamber, adapted to be depressed by fluid pressure; means for adjusting the travel of said piston, to vary the capacity of the dispensing chamber; fluid control means adapted to control the upward speed of said piston; means for adjusting said fluid control means to provide varying speed of travel for said piston; an inlet valve adapted to be seated in the upper surface of said dispensing chamber; dispensing valve for said chamber disposed substantially above the top of said chamber; operating means for opening the dispensing valve and means actuated by the operating means for closing the open intake valve before the dispensing valve is opened.

7. In a beer dispensing device the combination of, a housing, a measuring cylinder; a measuring piston disposed for reciprocation within said cylinder; means for actuating said piston; a stop for said piston adapted to be adjusted in position from the outside of said housing to control the extreme downward travel of said piston; fluid control means adapted to regulate the rate of travel of said piston during its dispensing cycle; means adapted to adjust and control said fluid control means from the outside of said housing; a spring-seated intake valve disposed in upper surface of said metering chamber; a spring-seated dispensing valve disposed in said cylinder; mechanically controlled means for timing the movement of fluid of said control means; an operating handle for said dispenser; connecting means for each of said intake valve, dispensing valve and fluid control means to time the operation of the same so that the intake valve will be closed, and the dispensing valve opened before the fluid control means is opened to prevent the flow of liquid and permit the movement of said piston.

8. In a beer dispensing device, having a housing, the combination of, a measuring cylinder; a metering and dispensing piston disposed for reciprocation within said cylinder, spring-actuated means for raising said piston during its dispensing stroke; an intake passageway disposed to introduce beer under pressure above said piston so as to depress the same against the pressure of said spring-actuated means; a stop for said piston adapted to be adjusted in position, from the outside of said housing, to control the extreme downward travel of said piston; fluid control means adapted to regulate the rate of travel of said piston during its dispensing stroke; means of said piston during its dispensing stroke; means adapted to adjust and control said fluid control means from the outside of said housing; a spring-seated intake valve disposed in the upper surface of said metering cylinder; a spring-seated dispensing valve disposed above the upper surface of said cylinder; mechanically controlled means for timing the movement of the fluid of said control means; an operating handle for said dispenser; means connected to said handle for each of said intake valves, dispensing valve and fluid control means arranged to time the operation of the same so that the intake valve will be closed, and the dispensing valve opened before the fluid control means is opened to permit the flow of control-liquid and permit the movement of said piston.

9. In a beer dispensing device, having a housing, the combination of, a measuring cylinder; a measuring piston disposed for reciprocation within said cylinder; spring-actuated means for raising said piston; an intake passageway disposed to introduce beer under pressure above said piston so as to depress the same against the pressure of said spring-actuated means; stop means for said piston adapted to be adjusted in position to control the extreme downward travel of said piston; fluid control means adapted to regulate the rate of travel of said piston during its dispensing cycle; means adapted to adjust and control said fluid control means; an intake valve disposed in said measuring cylinder; a dispensing valve disposed in said cylinder; mechanically controlled means for timing the movement of fluid of said control means; an operating handle for said dispenser; connecting means for each of said intake valve, dispensing valve and fluid control means to time the operation of the same control means to time the operation of the same so that the intake valve will be closed, and the dispensing valve opened before the fluid control means is opened to prevent the flow of liquid in said fluid control means and permit the movement of said piston.

10. In a device for measuring and dispensing gas-charged liquids the combination of a metering chamber; a piston disposed in said chamber for movement along its axis; a liquid supply line adapted to supply liquid under pressure to depress said piston; an intake valve communicating with the metering chamber; a discharge valve located in the uppermost portion of said chamber; fluid means for controlling the upward movement of said piston; means for adjusting the said control means adapted to predetermine the rate of upward travel of said piston; resilient means disposed to urge the measuring piston upwardly to effect the discharge of the measured liquid from said chamber and a manual control handle, suitably connected, to operate the intake valve, fluid control means, and the discharge valve automatically in proper phase relationship.

11. In a device for measuring and dispensing gas-charged liquids the combination of a metering chamber; a measuring piston disposed in said chamber for movement along a vertical axis; a liquid supply line adapted to supply liquid to said chamber; an intake valve communicating with the metering chamber above said piston; a discharge valve located in the uppermost portion of said chamber; a gas trap chamber disposed below said discharge valve; a fluid controlled retarding means for controlling the upward movement of said piston and the rate of such movement; control means adapted to predetermine the maximum downward travel of said measuring piston; compression springs disposed to urge the measuring piston up; a manual control handle suitably connected to operate the device, and mechanically operated air venting means for the chamber above said piston and adjacent said discharge valve.

12. In a beer dispensing device the combination of, a metering chamber; a reciprocable piston disposed within said chamber, said piston adapted to be depressed by fluid pressure; fluid control means adapted to maintain a desired minimum fluid pressure on said piston; means disposed to resist said fluid pressure and to raise said piston when said fluid pressure ceases to act upon said piston; an intake valve for said metering chamber; dispensing valve for opening said dispensing valve; means for holding said intake valve open and means controlled by the operating means for releasing the holding means whereby the intake valve is closed before the dispensing valve is opened.

THOMAS A. HUTSELL.